Patented Sept. 10, 1946

2,407,452

UNITED STATES PATENT OFFICE 2,407,452

PREPARATION OF β-SUBSTITUTED HOMOLOGUES OF INDOLE

Robert Robinson and Rita Harriet Cornforth, Oxford, and Trustham Frederick West, London N. 1, England, assignors to Stafford Allen and Sons Limited, London, England No Drawing. Application August 21, 1942, Serial No. 455,658. In Great Britain September 12, 1941

3 Claims. (Cl. 260—319)

The β-substituted indole homologue most widely used commercially is β-methylindole (skatole), which is a valuable constituent in certain perfumery products. It has not however hitherto been possible to produce skatole or other β-alkyl-indoles synthetically, by an economical process, owing to the difficulty or expense in obtaining the necessary intermediates or the poor yield obtained.

We have found that, when indole is heated under pressure in an autoclave with a solution in an alcohol of the formula $R.CH_2$—OH, $RR^1CH$—OH or XCH—OH, of the corresponding alcoholate of an alkali metal or an alkaline earth metal, the group $R.CH_2$—, $RR^1CH$— or XCH— is introduced selectively in the β-position in the indole nucleus, and that there is no tendency for substitution to take place in the α-position. In this formula, R and $R^1$ may be the same or different, and represent a hydrogen atom, an alkyl or aryl group, or an aralkyl group other than a benzyl or substituted benzyl group and XCH is the residue of a cyclic secondary alcohol such as cyclopentanol or cyclohexanol.

The invention accordingly provides a process for the manufacture of a β-substituted homologue of indole, which comprises heating indole under pressure in an autoclave with a solution, in an alcohol as above defined, of the corresponding alcoholate of an alkali metal or an alkaline earth metal.

According to the invention, in carrying out the above reaction the indole may be replaced by an indole having an alkyl group substituted in the benzene nucleus.

A case of particular technical importance is that of the alkylation of indole-α-carboxylic acid which may be obtained, as is well known, by the reduction of the product obtained by condensing o-nitrotoluene with ethyl oxalate in the presence of alcoholic sodium ethoxide.

We find that when indole-α-carboxylic acid or a soluble salt thereof is heated with a solution of sodium or other alkali metal in an alcohol $R.CH_2OH$ (where R is hydrogen or an alkyl or aryl group), the group $R.CH_2$— is introduced into the β-position and the carboxyl group is eliminated. We do not include the use of secondary alcohols when starting from indole-α-carboxylic acid. The overall reactions which take place may be represented as follows:

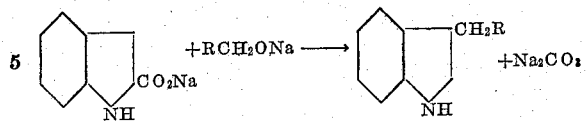

If desired, the α-carboxylic acid of an indole having an alkyl group substituted in the benzene nucleus may be used in place of indole-α-carboxylic acid.

The reactions according to the invention are found to give yields of skatole and other β-substituted indoles of the order of 60–70% of the theoretically possible and hence are suitable for use in manufacturing processes on a commercial scale.

The following are typical examples of how the invention can be carried into practice, the temperatures quoted being centigrade temperatures in each case:

(1) *Skatole*

(a) Indole-α-carboxylic acid (10 g.) was heated with a solution of sodium (12 g.) in methyl alcohol (150 c.c.) in an autoclave at 210–220° for 12 hours. The bulk of the methyl alcohol was removed by distillation and the remainder by steam distillation. The product was isolated by steam distillation and proved to be skatole (5.2 g.; 63%) M. P. 93°.

(b) Indole (10 g.) was heated in an autoclave with a solution of sodium (12 g.) in methyl alcohol (150 c.c.) at 210–220° for 12 hours. The skatole was isolated by steam distillation and the yield in this case was 8 g. (171%), M. P. 93°.

(2) *β-Ethyl indole*

Indole-α-carboxylic acid (10 g.) was heated in an autoclave with a solution of sodium (12 g.) in ethyl alcohol (210 c.c.) at 210–220° for 12 hours. The alcohol was removed by steam distillation and the product steam distilled. The distillate was saturated with sodium chloride and extracted with ether. After drying and removal of the ether the product distilled at 150–156°/20 mm. It crystallised slowly forming large plates, M. P. 37°. Yield, 5.6 g. (62%) (Found: C, 82.6; H, 7.6; N, 9.5%. Calculated for $C_{10}H_{11}N$: C, 82.8; H, 7.6; N, 9.6%).

The picrate crystallised from benzene-light petroleum (60–80°) in red needles, M. P. 121°. This is in agreement with the value given by von Braun and several other authors for β-ethylindole picrate but at variance with the value recorded by some Italian chemists. The colour reaction with Ehrlich's reagent closely resembles that given by skatole and is quite different from that characteristic of α-alkylindoles. This applies to the products of (3) and (5).

(3) β-n-Propyl indole

Indole-α-carboxylic acid (10 g.) was heated in an autoclave with a solution of sodium (12 g.) in n-propyl alcohol (250 c.c.) at 210–220° for 12 hours. The product was isolated by steam distillation, ether extraction and distillation. It was obtained as an almost colourless oil (6.3 g.; 64%) B. P. 162–4°/20 mm. (Found: C, 82.8; H, 8.3; N, 8.5%. $C_{11}H_{13}N$ requires C, 83.0; H, 8.2; N, 8.8%.)

The picrate crystallised in red needles from benzene-light petroleum (60–80°) M. P. 113–114°.

(4) β-Isopropyl indole

Indole (5 g.) was heated in an autoclave with a solution of sodium (6 g.) in isopropyl alcohol (130 c.c.) for 12 hours at 210–220°. The product was isolated by steam distillation, ether extraction and distillation. It was thus obtained as a colourless oil (4.3 g.; 63%), B. P. 155–160°/20 mm. (Found: C, 82.8; H, 8.4; N, 8.7%. Calculated for $C_{11}H_{13}N$: C, 83.0; H, 8.2; N, 8.8%.)

The picrate formed red needles from benzene-light petroleum (60–80°), M. P. 102–103°.

(5) β-n-Butyl indole

Indole-α-carboxylic acid (10 g.) was heated in an autoclave with a solution of sodium (12 g.) in n-butyl alcohol (250 cc.) for 12 hours at 210–220°. The product was isolated in the usual manner and obtained as a colourless oil B. P. 171–2°/20 mm. Yield, 6.6 g. (62%). (Found: C, 82.8; H. 8.7; N, 8.1%. $C_{12}H_{15}N$ requires C, 83.2; H, 8.7; N, 8.1.)

The picrate crystallised in red needles from benzene-light petroleum (60–80°) M. P. 114°.

(6) β-Benzyl indole

Indole-α-carboxylic acid (10 g.) was heated in an autoclave with a solution of sodium (12 g.) in benzyl alcohol (200 c. c.) at 210–220° for 12 hours. The reaction mixture was subjected to steam distillation. When the oil began to come over more slowly and was partially crystallising the distillation was stopped and the residue extracted with ether. After drying and removal of the ether the remaining oil crystallised. Recrystallised from light petroleum (80–100°) it formed colourless, prismatic needles, M. P. 103° (8.5 g.; 66%). By crystallising again from light petroleum and then from aqueous alcohol the M. P. was raised to 111°. (Found: C, 87.0; H, 6.5; N, 6.7%. $C_{15}H_{13}N$ requires C, 87.0; H, 6.3; N, 6.6%.)

The picrate crystallised from benzene-light petroleum (60–80°) in red needles M. P. 113°.

Benzoic acid (about 40 g.) was formed as a by-product. The odour of benzaldehyde was also observed.

(7) 3:7-Dimethyl indole 7-methyl indole (10 g.) was heated in an autoclave with a solution of sodium (12 g.) in methyl alcohol (150 c. c.) at 210–220° for 12 hours. The product was isolated by steam distillation. Recrystallised from light petroleum (40–60°) it formed colourless plates M. P. 56° (8 g.; 73%). (Found: C, 82.7; H, 7.7; N, 9.6%. Calculated for $C_{10}H_{11}N$; C, 82.8; H, 7.6; N, 9.6%.)

The picrate formed red needles from benzene-light petroleum (60–80°) M. P. 164°.

(8) 3-Cyclohexyl-7-methyl indole 7-methyl indole (5 g.) was heated with a solution of sodium (6 g.) in cyclohexanol (200 c. c.) at 210–220° for 12 hours. The reaction mixture was steam distilled until the amount of oil coming over was small. The residue, which partially crystallised, was taken up in hot methyl alcohol and allowed to stand. 3-cyclohexyl-7-methyl indole separated in colourless rhombic plates (5.6 g.; 82%), M. P. 115° (Found: C, 84.7; H, 9.2; N, 6.6%. $C_{15}H_{19}N$ requires C, 84.5; H, 8.9; N, 6.6%.)

The picrate could be obtained, but it was very unstable and dissociated on recrystallisation even from inert solvents.

In all the examples the autoclave was not completely filled with the reaction mixture and air was not removed from the space in the autoclave not filled by the mixture.

γ-phenyl propyl alcohol is an example of an alcohol containing an aralkyl group which will react according to the invention with indole, in the presence of an alkaline or alkaline earth metal, to produce the corresponding β-substituted homologue of indole.

The invention includes β-substituted indoles, such as skatole, when made by the process described and claimed herein.

What we claim as our invention and desire to secure by Letters Patent is:

1. A process for the manufacture of skatole, which comprises heating indole-α-carboxylic acid under pressure with a solution in methyl alcohol of sodium methoxide.

2. A process for the manufacture of β-ethyl indole, which comprises heating indole-α-carboxylic acid under pressure with a solution in ethyl alcohol of sodium ethoxide.

3. A process for the manufacture of β-substituted derivatives of indole, which comprises heating under pressure a substance selected from the group consisting of α-carboxylic acids of indole and α-carboxylic acids of those homologues of indole which are formed by substitution of an alkyl group for a hydrogen atom in the benzene nucleus, said acids being unsubstituted in the β-position and a solution in an alcohol of formula $R.CH_2OH$ of the corresponding alcoholate of an alkali metal, in which R is selected from the group consisting of hydrogen, alkyl and aryl radicals.

ROBERT ROBINSON.
RITA HARRIET CORNFORTH.
TRUSTHAM FREDERICK WEST.